Aug. 1, 1961     R. E. DOWNS     2,994,568
TAKE-UP UNIT

Filed Sept. 12, 1958     2 Sheets-Sheet 1

INVENTOR
RUSSELL E. DOWNS
BY
ATTORNEYS

Aug. 1, 1961  R. E. DOWNS  2,994,568
TAKE-UP UNIT

Filed Sept. 12, 1958  2 Sheets-Sheet 2

INVENTOR
RUSSELL E. DOWNS
BY
Mitchell Bechert
ATTORNEYS

United States Patent Office 2,994,568
Patented Aug. 1, 1961

2,994,568
TAKE-UP UNIT
Russell E. Downs, New Britain, Conn., assignor to The Fafnir Bearing Company, New Britain, Conn., a corporation of Connecticut
Filed Sept. 12, 1958, Ser. No. 760,654
4 Claims. (Cl. 308—59)

My invention relates to a take-up unit. Such units are employed usually for mounting the opposite ends of shafts carrying pulleys, drums or chain sprockets for conveyors and the like. The mountings for the shaft ends are movable so as to increase or decrease the tension in the members trained over the pulleys, drums, sprockets or the like.

It is an object of the invention to provide an improved form of take-up unit.

It is another object to provide an improved form of take-up unit formed of pressed metal and adaptable for many applications where take-up units are or may be employed.

A more specific object is to provide an improved form of take-up unit which will fit flat and seal against a flat surface on a base so as to prevent leakage of material past a shaft which extends through an enlarged hole in the base on which the take-up unit is mounted.

Other objects and various features of novelty and invention will be hereinafter pointed out or will become apparent to those skilled in the art.

Briefly stated, in a preferred form of the invention, the take-up unit is formed of sheet metal and includes a base plate to fit against the mounting base such as the side of a conventional housing or the like. This plate is preferably flat and fits flat against the housing surface so as to be in fairly tight engagement therewith so as to prevent leakage between the base plate and mounting base. The take-up unit includes also a cover sheet or cover cap fitting over the base plate and the base plate and cover plate have complementary seats and registering openings, whereby a bearing may fit in the complementary seats in the two plates and a shaft may pass through the openings. The two plates are secured together preferably with the bearing in place and the latter in place on the shaft. A take-up member is secured to one or both of the plates so as to move the latter with the bearing and the shaft housed therein for taking up or slackening off on the conveyor or the like on the shaft.

In the drawings which show for illustrative purposes only a preferred form of the invention:

Figure 1:
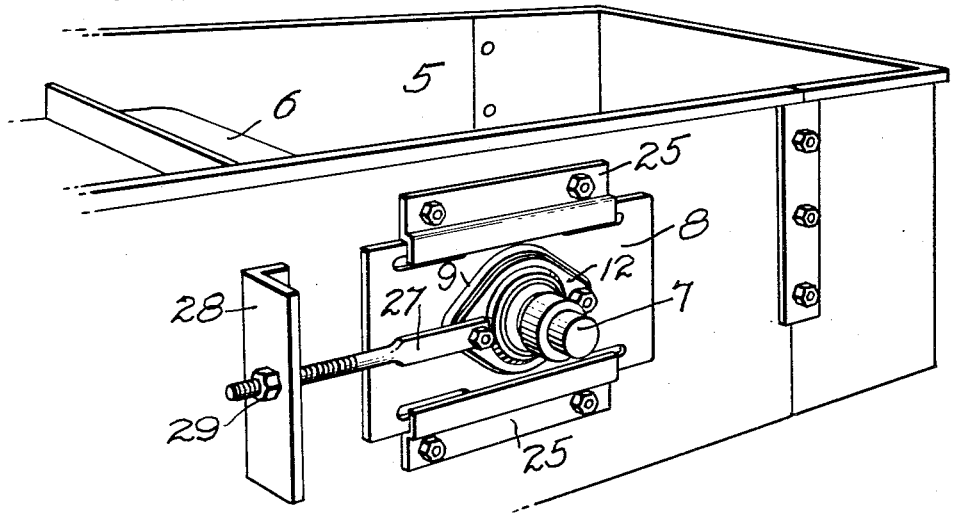
FIG. 1 is an isometric view of a conventional type of housing for a conveyor or the like and through which a shaft passes, the ends being mounted in take-up units at each end.

In said drawings, a conventional type of housing 5 has been illustrated. This may be part of a farm implement such as a hay loader, elevator or other device involving a conveyor 6 mounted on a drum or pulley carried by a shaft 7 extending through the housing 5 and mounted on two take-up units to be described.

The take-up unit preferably comprises a sheet metal base plate 8 having a substantial land 9 struck-up therefrom, the particular land shown being of generally diamond shape, but it may be of any shape desired, such as circular. The land has an enlarged opening 10 and the metal surrounding the opening is pressed down, as indicated at 11, so as to form a circumferentially extending annular housing flange preferably of generally spherical shape on the inside, and it may extend down to or almost to the plane of the bottom of the base plate 8.

The top plate or cover cap is preferably in the form of a flat metal sheet 12 which has a hole 13 therein, and the metal surrounding the hole is pressed upwardly, as indicated at 14, forming a circumferentially extending annular housing flange complementary to the flange 11 and preferably of spherical form on the inside. The cover plate 12 is designed to fit flat against the land 9 and the housing flanges 11, 14 house a bearing, such as an antifriction bearing including an outer ring 15, an inner ring 16 and interposed antifriction bearing members, such as balls 17. The outer ring is preferably of generally spherical form on the outside and fits the generally spherical seat formations of the base plate and the cover plate, as described. When the two plates are secured together, the outer ring may move slightly so that the bearing aligns itself in the housing without unduly stressing the bearing. The inner ring 16 may be held on the shaft 7 as by means of a locking collar 18 of well known form, as will be understood.

The base plate 8 and cover plate 12 have registering openings, preferably square as indicated at 19, and securing bolts extend through the openings. These bolts 20 have heads housed within struck-up land 9 on the base plate. Carriage bolts having square shanks will fit in the square holes in the base or cover plates, or both, so as to hold the same against turning when the nuts are turned up, as will be understood. It will be seen that the land 9 is struck up sufficiently high so that the heads of the bolts, whether they be carriage bolts or others, may be adequately housed within the land and between the outer periphery thereof, and the struck down flange 11, all without having the head of the bolt engage the surface of the housing.

The take-up unit will be movably or slidably held on its base by any suitable means. In the form shown, there are two offset track guides 25 rigidly secured to the base or foundation 5 and overlapping the top and bottom edges of the base plate 8, as will be clear. The base plate 8 is a snug fit between the offset track guides 25 and the base 5 so that little or no material may leak out between those two plates 8 and its base or foundation. Instead of the offset track guides, just noted, it will be clear that bolts, or the like, could be passed through the elongated slots 26 in the base plate 8 so that when slightly loosened, the base plate may be moved to adjust the conveyor or the like.

Figure 2:
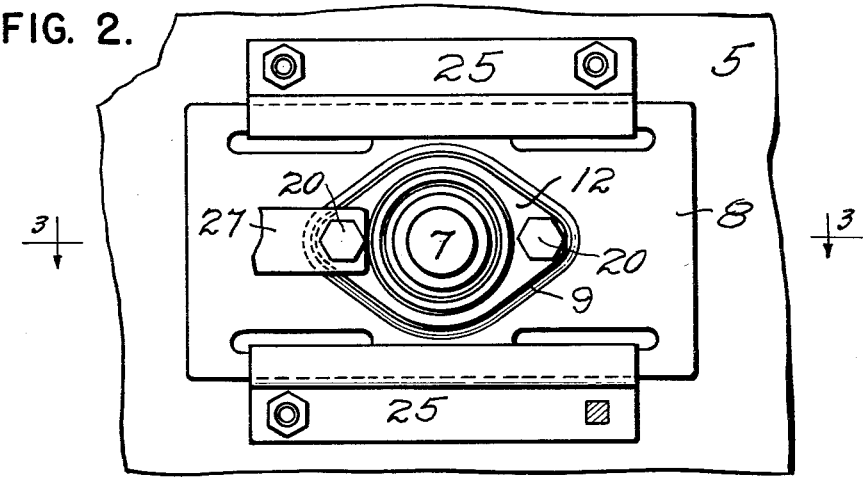
FIG. 2 is an enlarged fragmentary axial view in elevation of the take-up unit shown in FIG. 1.
Figure 3:
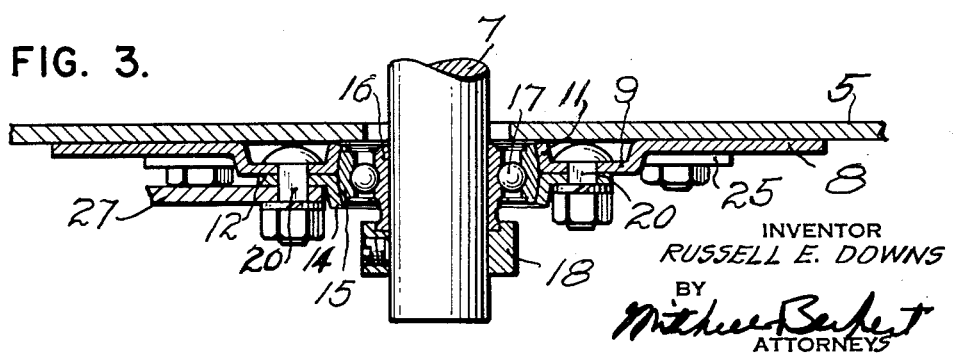
FIG. 3 is an enlarged sectional view, taken substantially in the plane of the line 3—3 of FIG. 2.
Figure 4:
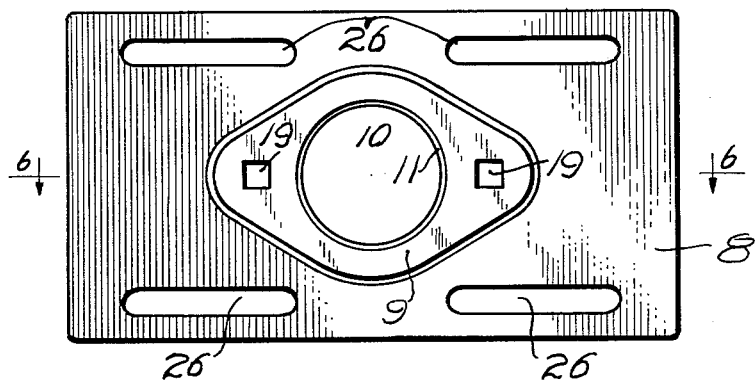
FIG. 4 is an axial detail view in elevation of the base plate forming part of the take-up unit.
Figure 5:
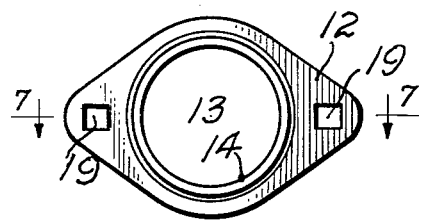
FIG. 5 is a similar view of a cover plate or cover cap, forming part of the take-up unit.
Figure 6:
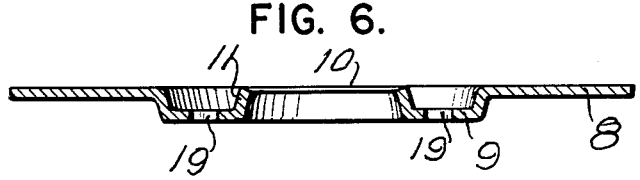
FIG. 6 is a sectional view, taken substantially in the plane of the line 6—6 of FIG. 4.
Figure 7:
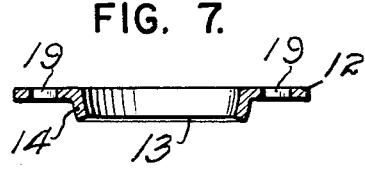
FIG. 7 is a sectional view, taken substantially in the plane of the line 7—7 of FIG. 5.

The take-up unit is preferably moved and in part held by a take-up member which in one form may consist of a bar 27 having a bolt hole therein. The left hand bolt 20 (FIGS. 1, 2 and 3) is shown as being slightly longer than the rest and as passing through the bolt hole in the take-up member 27. Thus the bar 27 is secured to the take-up unit so that the latter may be readily moved for the take-up function. The free end of the take-up member 27 may pass through an angle bracket 28 secured to the housing 5, and there may be a nut (not shown) on the inside of the angle bracket and a lock nut 29 on the outer side of the angle bracket so as to definitely hold the take-up member 27 and the unit in place. The particular take-up member 27 shown is a compression member, but, of course, could be placed on the opposite side and become a tension member.

It will be seen then that I have provided an improved form of take-up unit which is very simple in construction and yet it will house the bearing securely and hold the shaft in definite position of adjustment. Two units will normally be used, as described, to hold the opposite ends of a shaft, and the two units are preferably duplicates of each other.

The bearings in the units will be carefully sealed to exclude foreign matter and due to the tight fit between the parts of the base and unit there will be little or no leakage of material from the interior of the housing 5. The take-up unit may be conveniently handled and sold as a unit and will have wide application in situations where a take-up unit is called for.

While the invention has been described in considerable detail and a preferred form illustrated, it is to be understood that various changes may be made within the scope of the invention, as defined in the appended claims.

I claim:

1. In a take-up unit, a base plate to fit adjustably in position against a support, said plate having a hole therein, said plate having within the outer confines thereof a pressed up land surrounding said hole, the outer confines of said plate being peripherally continuously joined to said land, the metal surrounding said hole being pressed down to form a continuous circumferentially extending annular flange having a generally spherical inner form, a cover cap having a circumferentially continuous flange to fit flat and circumferentially continuously on said land from said support and having a hole therein with the metal surrounding said hole pressed up to form a continuous circumferentially extending annular flange of generally spherical form complementary to said first mentioned flange, whereby said flanges form a housing for the outer rim of a bearing, said land and said cover cap having registering bolt holes therethrough, said land being sufficiently above the bottom of said base plate to form a housing for the head of a bolt extending through said bolt holes.

2. In the combination defined in claim 1, a bolt through two of said registering bolt holes, a take-up member having a hole to receive said bolt, whereby said bolt may serve to hold said base and cover plates together and hold said take-up member to said plates.

3. In a take-up unit, a base plate having substantially flat outer confines to fit flat and adjustably in position against a support, said base plate having an enlarged shaft hole generally centrally located therein, said plate having a pressed up land circumferentially continuously surrounding said shaft hole and peripherally continuously joined to the outer confines of said base plate, the metal of said land surrounding said shaft hole being bent down to form a circumferentially extending annular housing flange, a cover cap to fit flat on the opposite side of said land from said support, said cover cap having a cirumferentially extending housing part complementary to said housing flange on said base plate, a bearing supported in said housing parts and held therein when said base plate and cover cap are secured together, said land and said cover cap having registering bolt holes therethrough, said land being pressed up sufficiently to form a housing for the head of a bolt extending through said registering bolt holes in said land and said cover cap, and a bolt having a head beneath said land and a shank passing through said holes and securing said cap to said land.

4. In the combination defined in claim 3, said housing for said head of a bolt being formed in part by said downturned annular flange on said land.

References Cited in the file of this patent

UNITED STATES PATENTS

| 675,196 | Colahan | May 28, 1901 |
| 1,043,631 | Schmitt | Nov. 5, 1912 |
| 1,946,086 | Lyman | Feb. 6, 1934 |
| 2,011,493 | Larsh | Aug. 13, 1935 |
| 2,030,193 | Arnold | Feb. 11, 1936 |
| 2,258,349 | Bone et al. | Oct. 9, 1941 |
| 2,300,957 | Miner | Nov. 3, 1942 |
| 2,475,393 | Keahey | July 5, 1949 |

FOREIGN PATENTS

| 9,877 | Great Britain | 1900 |